(12) United States Patent
Jinzenji

(10) Patent No.: US 10,599,345 B2
(45) Date of Patent: *Mar. 24, 2020

(54) MEMORY DEVICE THAT WRITES DATA INTO A BLOCK BASED ON TIME PASSAGE SINCE ERASURE OF DATA FROM THE BLOCK

(71) Applicant: TOSHIBA MEMORY CORPORATION, Tokyo (JP)

(72) Inventor: Akihide Jinzenji, Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,076

(22) Filed: Jun. 28, 2018

(65) Prior Publication Data

US 2018/0314444 A1    Nov. 1, 2018

Related U.S. Application Data

(63) Continuation of application No. 15/073,539, filed on Mar. 17, 2016, now Pat. No. 10,019,179.

(60) Provisional application No. 62/242,419, filed on Oct. 16, 2015.

(51) Int. Cl.
    *G06F 12/02* (2006.01)
    *G06F 3/06* (2006.01)
    *G06F 12/08* (2016.01)

(52) U.S. Cl.
    CPC .......... *G06F 3/0619* (2013.01); *G06F 3/064* (2013.01); *G06F 3/0652* (2013.01); *G06F 3/0679* (2013.01); *G06F 12/0246* (2013.01); *G06F 12/08* (2013.01); *G06F 2212/1024* (2013.01); *G06F 2212/1032* (2013.01); *G06F 2212/7201* (2013.01); *G06F 2212/7205* (2013.01)

(58) Field of Classification Search
    None
    See application file for complete search history.

(56) References Cited

U.S. PATENT DOCUMENTS

| | | | |
|---|---|---|---|
| 7,710,777 | B1 | 5/2010 | Montierth et al. |
| 8,681,554 | B2 | 3/2014 | Suzuki |
| 8,745,318 | B2 | 6/2014 | Rub et al. |
| 8,929,143 | B2 | 1/2015 | Suzuki |
| 2010/0049907 | A1 | 2/2010 | Kitsunai et al. |
| 2013/0051144 | A1 | 2/2013 | Suzuki |
| 2014/0310445 | A1 | 10/2014 | Fitzpatrick et al. |

(Continued)

*Primary Examiner* — Kaushikkumar M Patel
(74) *Attorney, Agent, or Firm* — Kim & Stewart LLP

(57) ABSTRACT

A memory device, includes a non-volatile semiconductor memory including a plurality of first areas, each corresponding to an erasing unit, each of the first areas including a plurality of second areas, each corresponding to a writing unit; and a controller circuitry configured to erase data stored in a first area of the non-volatile semiconductor memory, track amount of time elapsed since the erasing data from the first area, write first data into one or more unwritten second areas of the first area before the tracked amount of time reaches a particular time period, and write second data into one or more unwritten second areas of the first area in response to the tracked amount of time reaching the particular time period, each of the writing of the first data and the writing of the second data being carried out independently of an instruction from a host.

24 Claims, 13 Drawing Sheets

(56) References Cited

U.S. PATENT DOCUMENTS

| | | |
|---|---|---|
| 2015/0026386 A1 | 1/2015 | Wakchaure et al. |
| 2015/0277795 A1 | 10/2015 | Choi et al. |
| 2016/0110114 A1* | 4/2016 | Moon .................. G06F 12/0246 711/103 |
| 2016/0188221 A1* | 6/2016 | Janik ..................... G06F 3/0611 711/103 |
| 2017/0060447 A1 | 3/2017 | Moon et al. |

* cited by examiner

| LBA | PBA | | DATA PRESENCE /ABSENCE |
|---|---|---|---|
| | BLOCK ID | PAGE ID | |
| | | | |
| | | | |
| | | | |
| ⋮ | ⋮ | ⋮ | ⋮ |

| BLOCK NUMBER | USED/UNUSED | VALID DATA RATIO | ERROR FLAG | NUMBER OF REWRITE TIMES |
|---|---|---|---|---|
| | | | | |
| | | | | |
| | | | | |
| ⋮ | ⋮ | ⋮ | ⋮ | ⋮ |

| FREE BLOCK ID | ERASING TIME |
|---|---|
| N-1 | Te(N-1) |
| N-2 | Te(N-2) |
| ⋮ | ⋮ |
| N-n | Te(N-n) | ated herein by reference.
MEMORY DEVICE THAT WRITES DATA INTO A BLOCK BASED ON TIME PASSAGE SINCE ERASURE OF DATA FROM THE BLOCK

CROSS-REFERENCE TO RELATED APPLICATIONS

This application is a continuation of U.S. patent application Ser. No. 15/073,539, filed on Mar. 17, 2016, which is based upon and claims the benefit of priority from U.S. Provisional Patent Application No. 62/242,419, filed on Oct. 16, 2015, the entire contents of each of which are incorporated herein by reference.

FIELD

Embodiments described herein relate generally to a memory device, in particular, a memory device that includes a non-volatile semiconductor memory.

BACKGROUND

A memory device such as an SSD (solid state drive) which has non-volatile semiconductor memory typically starts a process of writing data which are requested to be written by a write command received from an external device, without overwriting data already written into the non-volatile semiconductor memory. Such a memory device may need to prepare, in advance, free physical blocks into which data have not been written, for the data writing. However, when the free physical blocks remain unwritten for a long period of time, reliability of data that are written into the free physical blocks may decrease.

Moreover, garbage collection may be carried out with respect to a physical block that still has an unwritten region therein. In such a case, an erase process is carried out to the unwritten pages of the physical block. However, when the erase process is carried out on the unwritten pages, reliability of data that are written into the unwritten pages in a later write process may decrease.

BRIEF DESCRIPTION OF THE DRAWINGS

FIG. 2 illustrates an example of an address translation table according to the first embodiment.
FIG. 3 illustrates an example of a block management table according to the first embodiment.
FIG. 5 illustrates an example of an erasing-time table according to the first embodiment.

DETAILED DESCRIPTION

Below, a memory device according to embodiments will be described with reference to the drawings.

According to an embodiment, a memory device, includes a non-volatile semiconductor memory including a plurality of first areas, each corresponding to an erasing unit, each of the first areas including a plurality of second areas, each corresponding to a writing unit; and a controller circuitry configured to erase data stored in a first area of the non-volatile semiconductor memory, track amount of time elapsed since the erasing data from the first area, write first data into one or more unwritten second areas of the first area before the tracked amount of time reaches a particular time period, and write second data into one or more unwritten second areas of the first area in response to the tracked amount of time reaching the particular time period, each of the writing of the first data and the writing of the second data being carried out independently of an instruction from a host.

First Embodiment

Figure 1:
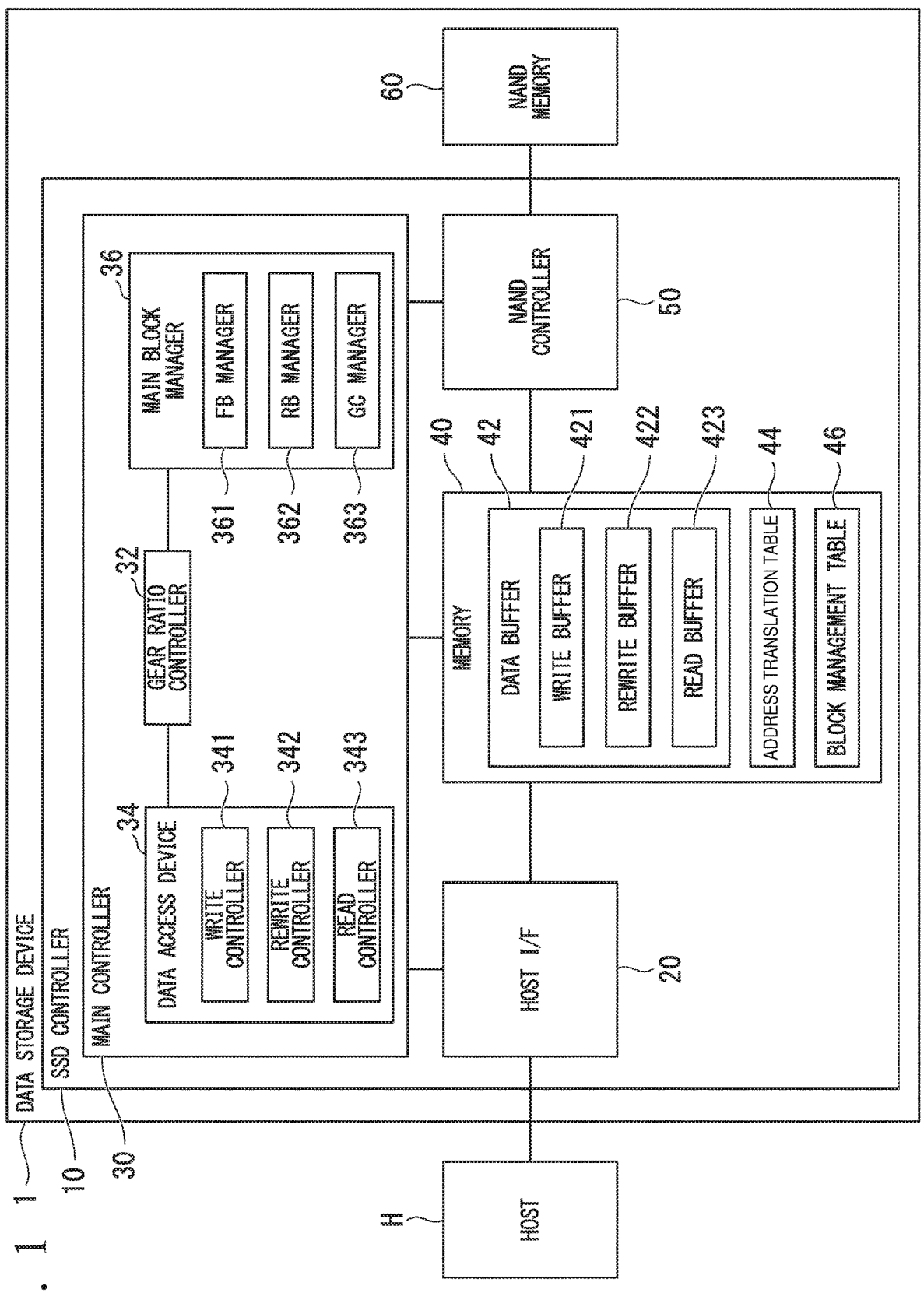
FIG. 1 illustrates an example of a data storage device according to a first embodiment.

FIG. 1 illustrates an example of a data storage device according to a first embodiment. A data storage device 1 may be an SSD (solid state drive). However, the data storage device 1 is not limited thereto. The data storage device 1 is connected to a host H via a host interface 20 (shown as a host I/F in FIG. 1). The host interface 20 may include a SATA (serial advanced technology attachment) interface or a SAS (serial attached SCSI (small computer system interface)), but it is not limited thereto. The host H may be an information processing device such as a personal computer and a server device, but it is not limited thereto.

The host H operates to read data written in the data storage device 1, or operates to write data into the data storage device 1. In such a case, host H generates a read command or a write command. The read command includes an LBA (logical block address) as a logical address. The write command includes an LBA (logical block address) as a logical address. The host H transmits the read command (read request) or the write command (write request) to the data storage device 1.

The LBA is, for example, a logical address which has a serial number starting at zero assigned to each sector (having a size of 512 bytes, for example). In the present embodiment, as a unit for managing data in the memory 40 and the NAND memory 60, a management unit called a cluster, which has a size larger than the sector size and smaller than the physical block size of the NAND memory 60, is used. While one type of management unit called the cluster is used in the present embodiment, two types of management units may be used, adding another management unit, which has a size larger than that of the cluster and smaller than or equal to the size of the physical block. In the present embodiment, it is assumed, for brevity, that the cluster size is the same as a page size of the NAND memory 60.

The host H may use arbitrary key information instead of the LBA, as the logical address. In this case, the data storage device 1 uses an address translation table for translation between key information and a physical address, instead of an address conversion table for translation between the LBA and the physical address.

The data storage device 1 includes an SSD controller (memory controller) 10 and an NAND flash memory (NAND memory) 60. However, the configuration is not limited thereto. The SSD controller 10 includes a host interface 20, a main controller 30, a memory 40, and an NAND controller 50. However, the configuration is not limited thereto. Moreover, the SSD controller 10 and the NAND memory 60 may be housed within the same housing, or may be connected via a cable, or via a network including the cable, a wireless communications network, etc.

The NAND memory 60, which includes a non-volatile semiconductor memory, stores therein user data requested by a write command transmitted from the host H. The user data are data generated through processing of the host H, for example. The user data include write data which are write-requested by a write command transmitted from the host H or data which have already been written into the NAND memory 60 based on the write command.

The NAND memory 60 may store system data of the data storage device 1 for backup, i.e., for redundantly holding data in a second storage region which is different from a first storage region to restore data in the first storage region when the data stored in the first storage region are lost or corrupted. The system data are generated in the data storage device 1, and used for executing various processes in the data storage device 1. The system data may include an address translation table 44 or a block management table 46 that are used for executing various processes and stored in the memory 40, for example.

The NAND memory 60 includes a memory cell array in which a plurality of memory cells is arranged in a matrix form, but the configuration is not limited thereto. The matrix form refers to a form in which elements thereof are lined up in the respective directions of a first direction and a second direction which intersects the first direction, e.g., row and column directions.

The NAND memory 60 includes a plurality of memory chips, each of which includes the memory cell array, but the configuration is not limited thereto. Each memory array includes a plurality of physical blocks. Each physical block includes a plurality of physical pages. Each physical block may include 16 physical pages, for example. Writing and reading of data into or from the NAND memory 60 are performed in units of the physical page by the NAND controller 50. Erasure of data in the NAND memory 60 is performed in units of a physical block by the NAND controller 50. In the present embodiment, a plurality of physical blocks is provided in the non-volatile memory and an erasure process on the non-volatile memory is executed in units of the physical block, but the configuration is not limited thereto. For example, erasure of data may be carried out for each region of the non-volatile memory, a storage capacity of which is set in advance.

The memory 40 is a semiconductor memory which enables access at a speed higher than that for the NAND memory 60, and is a random access memory. While the memory 40 may be an SDRAM (synchronous dynamic random access memory) or an SRAM (static random access memory), the configuration is not be limited thereto. The memory 40 includes a storage region used as a data buffer 42, a storage region for storing the address translation table 44, and a storage region for storing the block management table 46. The data buffer 42 includes a write buffer 421, a rewrite buffer 422, and a read buffer 423. It is not necessary to configure the memory 40 as a single unit of memory, and the memory 40 may be an aggregation of a plurality of memories.

In the write buffer 421, write data (user data) transmitted from the host H are stored before the write data are written into the NAND memory 60. In the read buffer 423, read data that have been read from the NAND memory 60 in accordance with a read command transmitted from the host H are stored before the read data are transmitted to the host interface 20. In the rewrite buffer 422, valid data stored in a physical block subjected to garbage collection are stored before they are again written into a transfer-destination physical block.

Garbage collection is a process of moving data (valid data) other than invalid data from a source physical block to an arbitrary physical block and releasing the source physical block (i.e., invalidate all data in the physical block), so that the physical block that has stored the invalid data can be reused for new data writing. To reuse the physical block that has stored the invalid data efficiently, a plurality of valid data sets stored in a plurality of physical blocks is moved to other one or more physical blocks and the plurality of physical blocks may be released (to be data-erased). As used herein, invalid data are data not associated with LBA, and valid data are data associated with LBA. The rewrite buffer 422 is also used in refresh and wear leveling which include operations of rewrite.

Refresh is a process of rewriting data stored in a target physical block to another physical block. For example, during the refresh, all data stored in the target physical block, or data (valid data) other than invalid data in the target physical block are rewritten into other physical blocks.

Wear leveling is a process performed so that the number of rewrite times, the number of erase times, or an elapsed time from erasure are uniform among physical blocks or among memory devices. The wear leveling may be carried out when a write command is received and when data already stored in the memory device are rearranged, independently of the write command.

The address translation table 44 indicates a relationship between logical addresses and physical addresses. FIG. 2 shows an example of the address translation table 44 according to the first embodiment. The address translation table 44 indicates correspondence between the physical address of the NAND memory 60, which shows the storage position of data in the NAND memory 60, and the logical address of the data in the NAND memory 60. In the present embodiment, the address translation table 44 includes a plurality of entries, each of which includes the LBA, the storage position (PBA: physical block address) in the NAND memory 60, and a data presence/absence flag which shows whether or not data are written in the corresponding location of the physical block, in association with each other. While the PBA may be expressed by the block ID and the page ID, the configuration is not limited thereto. By referring to the address translation table 44, the main controller 30 can find the physical address of data corresponding to the logical address. The address translation table 44 is used for read, write, garbage collection, refresh, etc. When writing of data into the NAND memory 60 causes the relationship between the logical address and the physical address to be changed, the address translation table 44 is updated by the main controller 30.

The block management table 46 in FIG. 1 indicates the state of each physical block in the NAND memory 60.

FIG. 3 illustrates an example of the block management table 46 according to the first embodiment. The block management table 46, for example, includes a plurality of entries, in each of which "used/unused" information, "valid data ratio", "error flag", and "the number of rewrite times" are associated with "block ID", which is identification information of the physical block.

The "used/unused" information is information showing whether each physical block is in an active state or a free (unused) state. The "valid data ratio" is a proportion of the number of pages in which valid data are stored with respect to the number of all pages included in the physical block. The "error flag" is a flag indicating that an error occurred when data stored in the physical block were read. The "number of rewrite times" is maintained for each of the physical blocks by the main controller 30.

The "used/unused" information is updated by the main controller 30 in accordance with execution of a write process or an erasure process by the main controller 30 (the data access device 34 or the main block manager 36). As for the "valid data ratio", a value thereof is rewritten by the main controller 30 when the proportion of valid data in the corresponding physical block is changed by data invalidation or data writing into the physical block. The "error flag" is changed to an error occurrence state by the main controller 30 (or the main block manager 36) when the main controller 30 receives a report of error occurrence from the NAND controller 50 and to a non-error occurrence state when refresh by the main controller 30 is completed.

As for the address translation table 44 and the block management table 46, not all of the information sets may be stored in the memory 40. For example, original information may be stored in the NAND memory 60, and written into the memory 40 when the data storage device 1 performs a process of writing or reading, etc., of data.

Returning to FIG. 1, the NAND controller 50 includes a DMA controller, an error correction circuit, a NAND interface circuit which performs an interface process with the NAND memory 60, etc., but the configuration is not limited thereto. The NAND controller 50 writes data temporarily stored in the memory 40 into the NAND memory 60, or reads data stored in the NAND memory 60 and transfers the read data to the memory 40. Moreover, the NAND controller 50 carries out an error correction on data transferred to the memory 40 and reports occurrence of an error and identification information of a block or a page in which the error has occurred to the main controller 30.

The main controller 30 includes a gear ratio controller 32, a data access device 34, and a main block manager 36. The functions (32, 34, and 36) of the main controller 30 may be achieved by a processor such as a CPU (central processing unit), etc., executing programs stored in program memory, or some or all of the functions of the main controller 30 may be achieved by hardware such as LSI (large scale integration), an ASIC (application specific integrated circuit), or a FPGA (field-programmable gate array), etc.

The gear ratio controller 32 controls a gear ratio, which is a ratio of the number of times or frequency of write operations executed by the data access device 34 in accordance with instructions from the host H with respect to the total number of times or frequency of processes such as a write in accordance with instructions from the host H, garbage collection, refresh write, etc.

The data access device 34 executes processes such as data read-write control, garbage collection on the NAND memory 60, refresh write, etc., based on a command transmitted from the host H. The data access device 34 outputs a read command, a write command, or an erase command to the NAND controller 50 to cause read, write, or erasure to be executed.

The data access device 34 includes a write controller 341, a rewrite controller 342, and a read controller 343.

The write controller 341 causes the NAND controller 50 to carry out a process of writing write data requested by the write command transmitted from the host H. The write controller 341 causes the NAND controller 50 to write the write data to an arbitrary physical block of the NAND memory 60.

When the write command and the write data are input, the write controller 341 writes the write data into the write buffer 421.

When the write controller 341 causes the NAND controller 50 to write the write data, the main controller 30 updates the address translation table 44 and the block management table 46. If the write data are written into a physical block into which no data have been written by the write controller 341, "used/unused" information is updated to "used". Moreover, if valid data are written into a physical block by the data access device 34, the main controller 30 updates the valid data ratio value to be higher.

The rewrite controller 342 causes the NAND controller 50 to carry out a process of rewriting data read from the NAND memory 60. The data to be written during the rewriting process includes data read from the NAND memory 60, which includes data subjected to processes such as garbage collection, refresh, etc. When the garbage collection or refresh is carried out, the rewrite controller 342 resets the source physical block as a free block.

When the source physical block is reset as a free block by the rewrite controller 342, the main controller 30 changes, for example, the "used/unused" information to "unused" and the value of the "error flag" to "no error occurrence" of the source physical block in the block management table 46. In the main controller 30, the rewrite controller 342 changes "used/unused" information of a movement-destination physical block in the block management table 46 to "used". Moreover, when valid data are written into the target physical block by the rewrite controller 342, the main controller 30 updates the valid data ratio value to be higher.

The read controller 343 causes the NAND controller 50 to carry out data reading from the NAND memory 60 based on a read command transmitted from the host H. When the read command and a logical address included in the read command are input, the read controller 343 refer to the address translation table 44 and causes the NAND controller 50 to read data corresponding to the logical address from the NAND memory 60. The read controller 343 causes the read buffer 423 to store therein the read data and causes the read result to be transmitted to the host H via the host interface 20.

When the main block manager 36 carries out the garbage collection, the write controller 341 and the read controller 343 may cause the NAND controller 50 to read data written in the source physical block from the NAND memory 60 and write the read data into the rewrite buffer 422.

The main block manager 36 manages the state of the physical block in the NAND memory 60. The main block manager 36 includes a free block (FB) manager 361, a refresh block (RB) manager 362, and a garbage collection (GC) manager 363, but the configuration is not limited thereto.

The free block manager 361 updates the block management table 46 based on use conditions of each physical block of the NAND memory 60 to manage the use conditions of each physical block of the NAND memory 60. The use conditions generally include an active block and a free block. The active block is a physical block in which valid data are stored. The free block is a physical block in which no valid data are stored, and into which new valid data can be written. Write data requested by a write command are written into the free block without the data written into the physical block being erased.

The free block manager 361 performs a process of maintaining, as free blocks, a predetermined number of physical blocks, such that write data may be written into the physical block without executing an erasure process when the write command is received from the host H. For example, the free block manager 361 refers to the block management table 46 to determine the number of free blocks. When the number of current free blocks is less than the predetermined number, the free block manager 361 causes a physical block which is currently an active block to be changed to a physical block of a free block. For example, the free block manager 361 performs garbage collection and causes data written in the physical block which is the active block to be moved to a different physical block and resets the physical block as a free block. Then, the free block manager 361 transmits a read command, a write command, and an erase command to the NAND controller 50 to cause movement of data and erase of data to be executed.

When the free block is formed by the free block manager 361, the main controller 30 changes "used/unused" information in the block management table 46 that corresponds to the physical block ID of the free block to "unused". When the free block is formed, the free block manager 361 may output the physical block ID of the free block to the NAND controller 50.

The refresh block manager 362 determines a physical block that requires refresh and causes the refresh to be carried out. When a report of an error occurrence is received from the NAND controller 50, the refresh block manager 362 detects a state that an error has occurred in the course of reading data from the NAND memory 60. The refresh block manager 362 specifies a physical block in which an error has occurred from information of the error occurrence reported from the NAND controller 50. The main controller 30 changes the value of an error flag in the block management table 46 to "occurrence present" for the physical block in which the error has occurred.

The refresh block manager 362 refers to the block management table 46 to determine the condition of the error occurrence of each physical blocks. The refresh block manager 362 determines a physical block which requires the refresh based on the error occurrence state of the physical block and causes the data access device 34 to execute the refresh.

Moreover, the refresh block manager 362 may count the number of physical blocks in which an error has newly occurred during a predetermined period, using a counter (not shown). The refresh block manager 362 may set the number of physical blocks in which the error has occurred during the predetermined period as information on the frequency of a request for carrying out the refresh due to the error.

The garbage collection manager 363 refers to the valid data ratio registered in the block management table 46 to select a physical block with a low valid data ratio among the active blocks. The garbage collection manager 363 causes the data access device 34 to carry out the garbage collection, during which the selected physical block is updated as a free block after data written in the selected physical block are read and rewritten into a different physical block.

The number of rewrite times in the block management table 46 is updated to a value plus one when garbage collection, refresh, or erasure process is carried out.

The above-described process that forms a free block (storable region), such as garbage collection carried out by the free block manager 361 or the garbage collection manager 363, or refresh carried out by the refresh block manager 362, includes a process of erasing data stored in the NAND memory (non-volatile memory) in units of a physical block. The physical block is a unit for erasing data in the NAND memory 60, but the configuration is not limited thereto. For example, the erasing may be carried out in units of a region of the non-volatile memory. In that case, some or all of the free block manager 361, the refresh block manager 362, and the garbage collection manager 363 operate to erase data stored in the non-volatile memory in units of the region.

Below, the NAND controller 50 according to the present embodiment is described.

Figure 4:
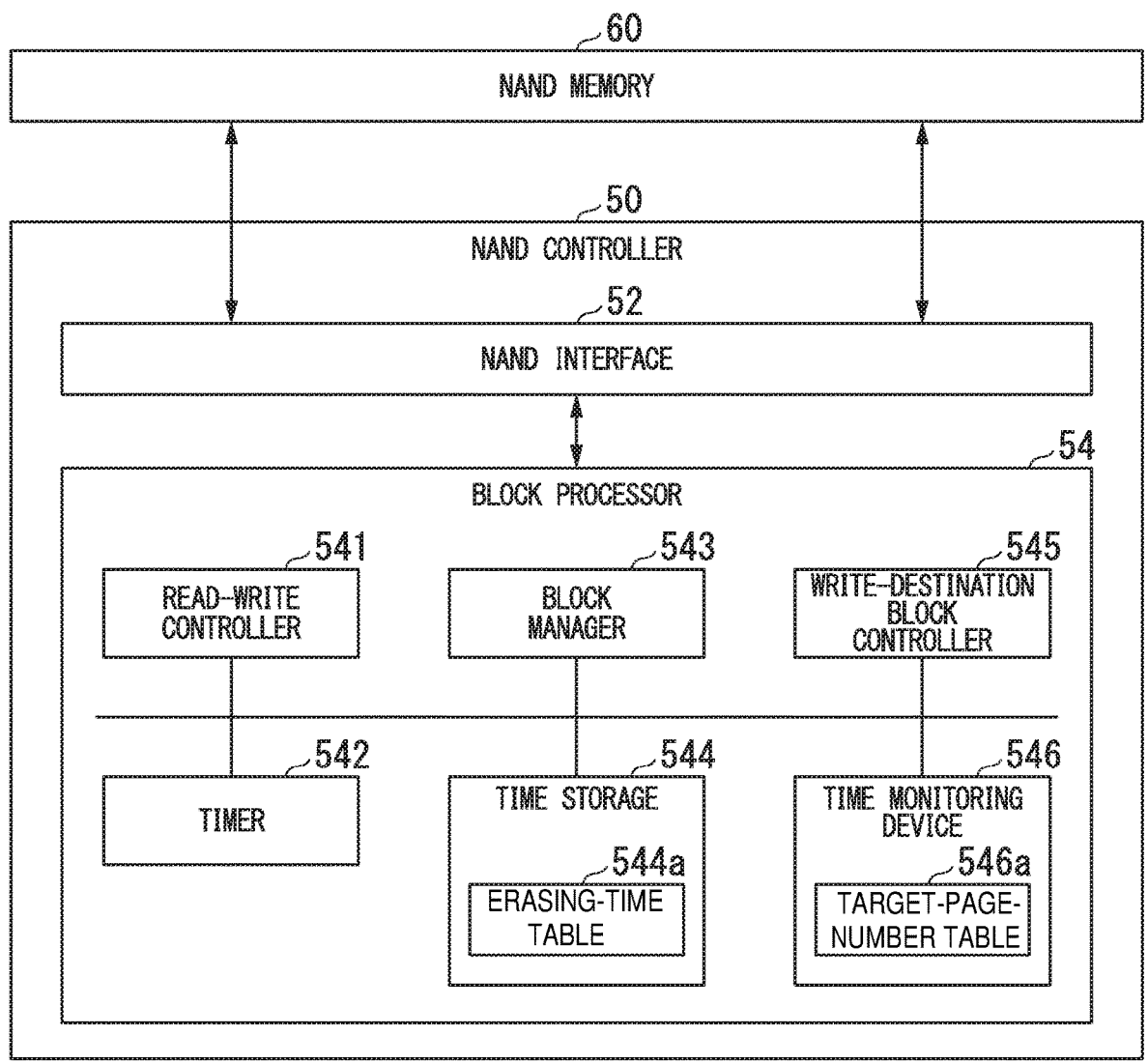
FIG. 4 illustrates a NAND controller of the data storage device according to the first embodiment.

FIG. 4 is a block diagram illustrating one example of the NAND controller 50 according to the first embodiment. The NAND controller 50 includes an NAND interface 52 and a block processor 54.

The NAND interface 52 is an interface circuit including data lines corresponding to a plurality of channels of the NAND memory 60 and in which a plurality of data sets, etc., are input/output to/from the NAND memory 60 in parallel. The NAND interface 52 transmits data sent from the block processor 54 to the NAND memory 60 and transmits data sent from the NAND memory 60 to the block processor 54.

The block processor 54 includes a read-write controller 541, a timer 542, a block manager 543, a time storage 544, a write-destination block controller 545, and a time monitoring device 546, but the configuration is not limited thereto. The functions (541, 542, 543, 545, and 546) of the block processor 54 may be implemented by processors such as a CPU, etc., executing programs stored in program memory, or some or all thereof may be achieved by hardware such as an LSI, an ASIC, an FPGA, etc.

The read-write controller 541 executes read or write on the NAND memory 60. In accordance with a read command sent from the main controller 30, the read-write controller 541 reads data written in the NAND memory 60 and sends the read result to the main controller 30 or the memory 40. In response to the write command sent from the main controller 30, the read-write controller 541 writes write data requested by the write command into the NAND memory 60.

The read-write controller 541 writes the write data into a physical page of a physical block that corresponds to an identification number of a physical page and an identification number of a physical block that are included in the write command. These identification numbers of the physical page and the physical block are included in the write command which causes the write data to be buffered in the write buffer 421 based on the address translation table 44.

The read-write controller 541 reads the read data from a physical page of a physical block corresponding to an identification number of a logical page and an identification number of a logical block that are included the read command. The read-write controller 541 may include the identification numbers of the physical page and the physical block into the read data and send the read result (the read data and the identification numbers) to the read buffer 423.

The timer 542 executes time measurement during the period in which the storage device is operated to update the operation time of the storage device.

The block manager 543 refers to "used/unused" information which is included in the block management table 46 and recognizes a block ID of a free block within the NAND memory 60. The block manager 543 sends the block ID of the free block to the write-destination block controller 545.

The time storage 544 acquires an operation time from the timer 542 when the free block is formed by the main block manager 36, as the erasing time of data at which the physical block set as the free block. The erasing time of the data in the physical block is, for example, the operation time when erase process is executed on the physical block by the read-write controller 541 in accordance with an erase command.

The time storage 544 stores an erasing-time table 544a in which a physical block ID of the free block and the erasing time are associated. FIG. 5 illustrates an erasing-time table 544a according to the first embodiment. The erasing time and the physical block ID of the free block are written to the erasing-time table 544a every time a free block is formed by the main block manager 36. The erasing-time and the physical block ID of the free block are erased from the erasing-time table 544a when an elapsed time for the free block reaches an upper limit time Tth. The time storage 544 is implemented as a register within the block processor 54, but the configuration is not limited thereto.

The write-destination block controller 545 controls a write-destination block into which write data are written. The write-destination block controller 545 designates a write-destination physical block managed by the block manager 543 and controls the read-write controller 541 to write the write data into the designated physical block.

Based on time elapsed from an erasing time to form a free block, the time monitoring device 546 controls the read-write controller 541 to write dummy data (e.g., pattern data of "0" and "1", or a bit sequence of all "0" or all "1") into a region of a physical block into which no data have been written so as to ensure that the size of the unwritten region of the physical block will decrease over time. The time monitoring device 546 reads the target-page-number table 546a, which indicates for each physical block a relationship between the time elapsed from the erasing time and a target number of pages of data that should be written in the physical block, to determine the number of pages of dummy data to be written.

The time monitoring device 546 reads the target-page-number table 546a to read the number of target pages that correspond to the elapsed time. The target-page-number table 546a is stored in a register within the block processor 54, but the configuration is not limited thereto. The read-write controller 541 writes the target number of pages of dummy data into the physical block specified by the write-destination block controller 545.

Figure 6A:
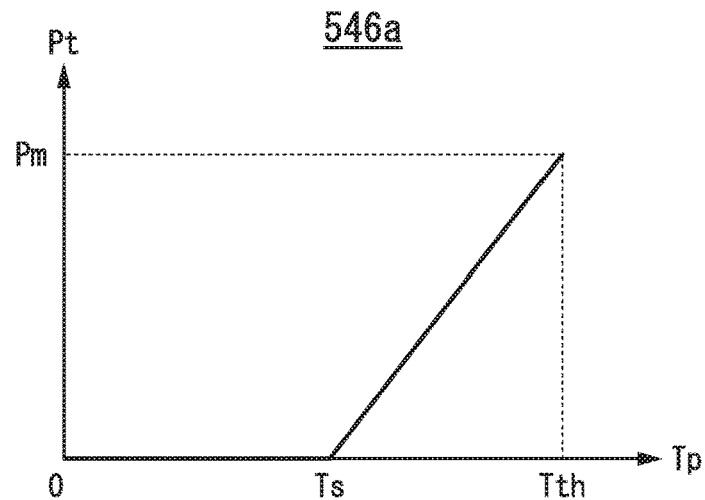
FIGS. 6A, 6B, and 6C are graphs that illustrate examples of a target-page-number table employed in the first embodiment.
Figure 6B:
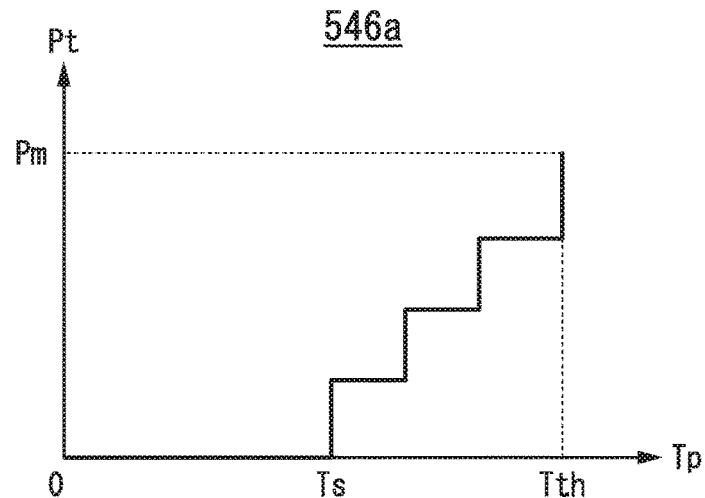
Figure 6C:
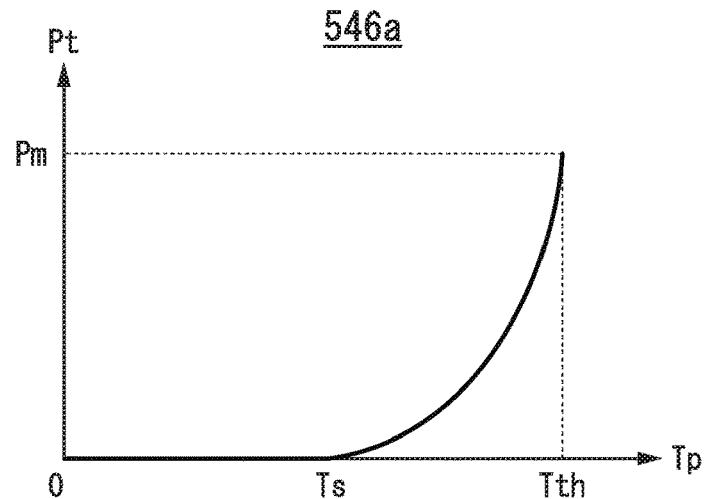

FIGS. 6A-6C are graphs that illustrate examples of a target-page-number table 546a of the first embodiment. In the first example of the target-page-number table 546a shown in FIG. 6A, in a period between 0 and a write start time Ts, the target number of pages is 0, and after the write start time Ts, the target write page number Pt increases in proportion to the elapsed time Tp. When the elapsed time Tp reaches an upper-limit time Tth, the target write page number Pt corresponds to the target page number Pm. The target page number Pm is a target value of an amount of data written into a physical block when the elapsed time Tp has reached the upper-limit time Tth. The upper-limit time Tth is a period (data retention period) which extends from a time data are erased to a time data written into the physical block are released.

In the second example of the target-page-number table 546a shown in FIG. 6B, in the period from 0 to the write start time Ts, the target write page number Pt is 0, and the target write page number Pt increases from the write start time Ts to the upper-limit time Tth in a stepwise manner. In the third example of the target-page-number table 546a shown in FIG. 6C, in the period from 0 to the write start time Ts, the target write page number Pt is 0, and the increase rate of the target write page number Pt increases in proportion to the amount of time elapsed from the write start time Ts.

The setting of the target-page-number shown in FIGS. 6A, 6B, and 6C are examples. Alternatively, the target write page number may be increased from the elapsed time Tp of zero, or the target write page number Pt may be rapidly increased during a period from the elapsed time Tp of zero to the upper-limit time Tth.

The maximum target page number Pm in the target-page-number table 546a may be the number of whole pages included in a physical block. In other words, the target-page-number table 546a may indicate a maximum amount of data storable in a physical block as the target value associated with an upper limit value of the elapsed time. The time monitoring device 546 refers to the target-page-number table 546a to cause the target page number Pt to correspond to the maximum number of pages of a free block at the time when the elapsed time Tp reaches the upper limit time Tth.

This maximum target page number Pm may be set to a number smaller than the number of whole pages in the physical block.

Below, a process of writing data to the free block formed by an erase process based on the elapsed time Tp is described.

Figure 7:
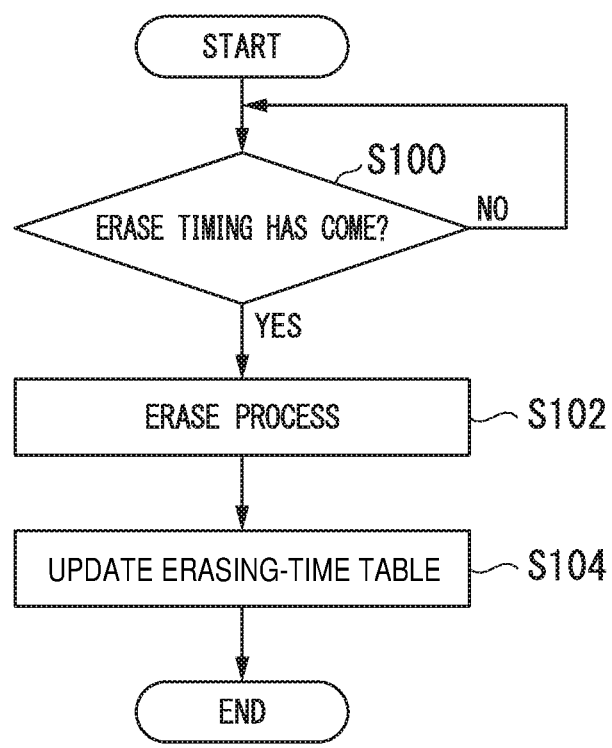
FIG. 7 is a flowchart illustrating a process of erasing data carried out in the data storage device according to the first embodiment.

FIG. 7 is a flowchart illustrating a flow of a process of erasing data stored in the data storage device 1 according to the first embodiment. First, the main block manager 36 of the data storage device 1 determines whether or not timing of erasing data for forming a free block in the NAND memory 60 has come (S100). The main block manager 36 determines that the timing for erasing data has come, for example when write data are written into a free block among a predetermined number of free blocks or when a data writing is performed based on a write command to the physical block reset as a free block through the refresh or the garbage collection. If the timing of erasing the data has not been reached (No in step S100), the main block manager 36 is brought into a standby state.

The main block manager 36 form a free block by erasing the data stored in the physical block of the NAND memory 60 (S102). The block manager 543 recognizes a physical block ID of the free block after the free block is formed by the main block manager 36 erasing data in the physical block. Moreover, the time storage 544 updates the erasing-time table 544a by registering the operation time measured when the free block is formed as an erasing time and the physical block ID of the free block (S104).

Figure 8:
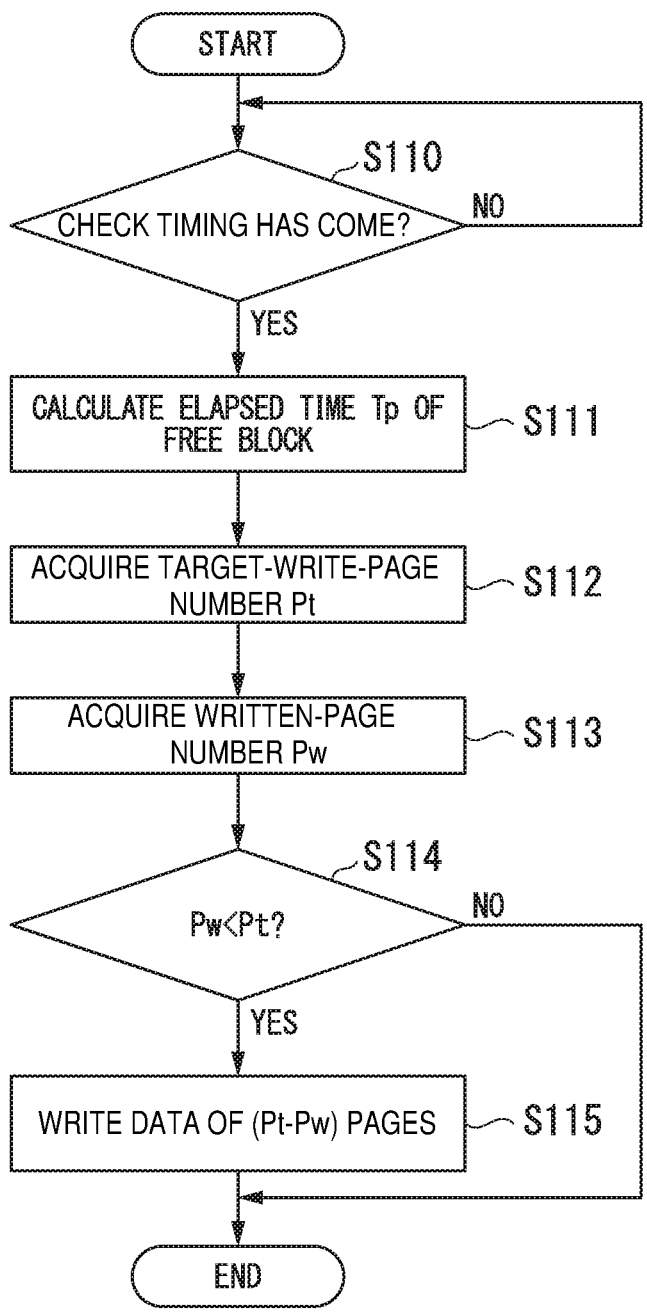
FIG. 8 is a flowchart illustrating a process of writing data carried out by the NAND controller according to the first embodiment.

FIG. 8 is a flowchart illustrating a flow of a process of writing data in the NAND controller 50 according to the first embodiment.

The block processor 54 determines whether or not a checking time for writing data in the physical block has come (S110). In the block processor 54, the time monitoring device 546 checks the written page number Pw on the physical block at a predetermined check cycle. While the predetermined check cycle may be a time interval shorter than a write cycle in which data are written by the read write controller 541, the configuration is not limited thereto. In other words, if it is determined that the checking time has come by the elapsing of the predetermined check cycle (Yes in step S110), the process proceeds to S111. To the contrary, the block processor 54 stands by when the checking time has not come yet (No in step S110).

If the checking time has come (Yes in step S110), the time monitoring device 546 calculates elapsed time Tp based on erasing time Te and the operation time measured by the timer 542 for each free block included in the erasing-time table 544a (S111). The time monitoring device 546 reads the target-page-number table 546a and acquires the target write page number Pt corresponding to the calculated elapsed time Tp (S112). Then, the time monitoring device 546 acquires the written page number Pw in the physical block, which is counted by the block manager 543 (S113).

The time monitoring device 546 determines whether or not the written page number Pw is smaller than the target write page number Pt (S114). The time monitoring device 546 completes the process, if the time monitoring device 546 determines that the written page number Pw is no less than the target write page number Pt (No in step S114). If the time monitoring device 546 determines that the written page number Pw is less than the target write page number Pt (Yes in step S114), then the time monitoring device 546 controls the write-destination block controller 545 and the read-write controller 541 such that dummy data equal in size to the number of pages that is the written page number Pw subtracted from the target write page number Pt, are written in the physical block (S115).

That is, if data equal in size to the target value associated with the elapsed time have not been written into the physical block, based on information stored in the target-page-number table 546a shown in FIG. 6, the read-write controller 541 writes the dummy data into the physical block such that total of data written in the physical block is equal to the target value.

Moreover, by executing the process in FIG. 8 each predetermined check cycle, the NAND controller 50 may write dummy data corresponding to the maximum target page number Pm into the physical block when the elapsed time Tp reaches the upper-limit time Tth.

Figure 9:
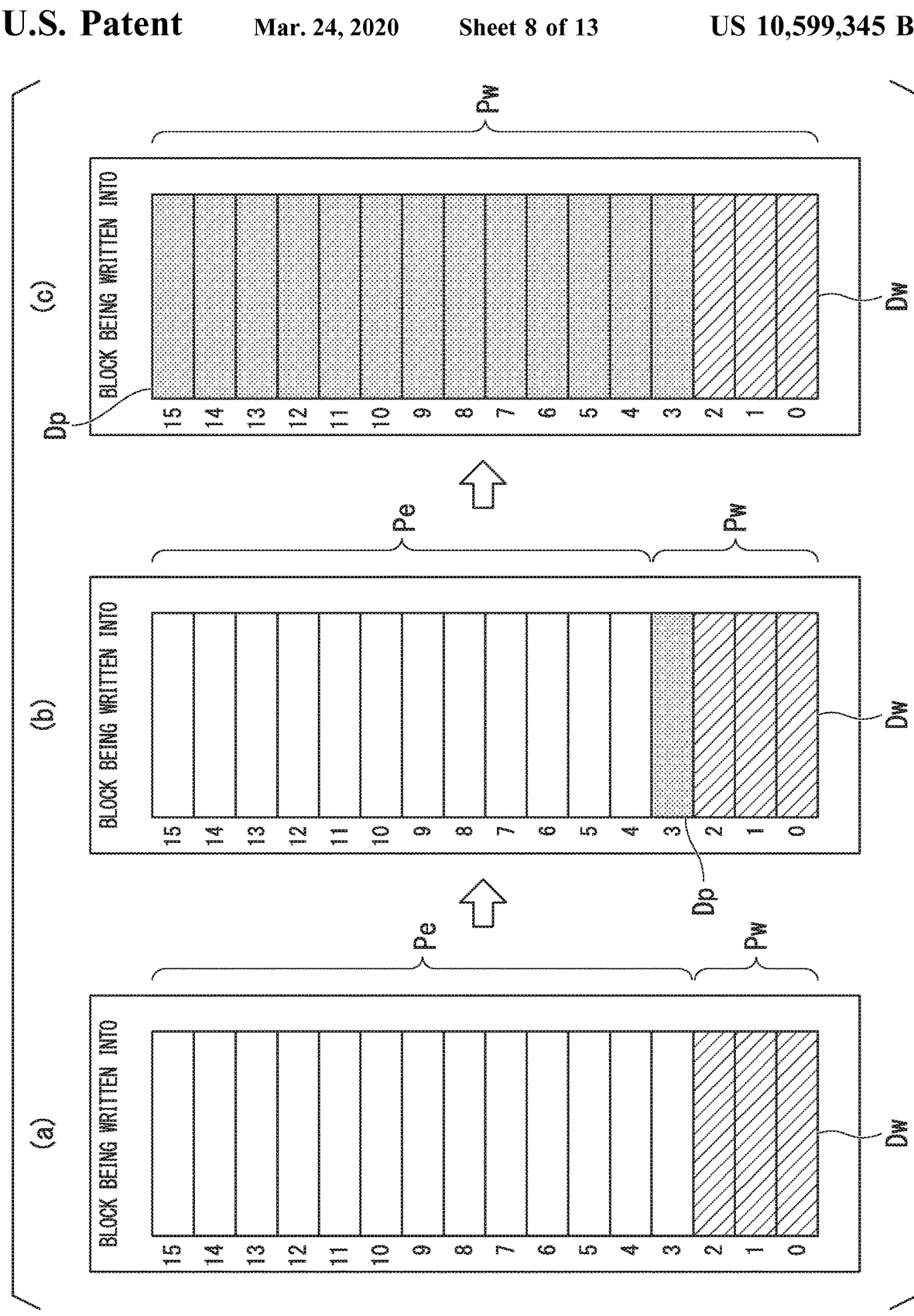
FIG. 9 illustrates an example of a manner in which data are written into a physical block according to the first embodiment.

FIG. 9 illustrates an example of how dummy data are written into a physical block according to the first embodiment. In a physical block into which dummy data are written by the block processor 54 (below described as the a target physical block), as shown in (a) of FIG. 9, for example, data Dw are written into physical pages having page ID of 0, 1, and 2. The physical pages having page ID of 0, 1, and 2 are recognized by the block processor 54 as written pages. Moreover, the physical pages having page ID of 3-15 in the physical block are blank pages Pe into which no data are written. Here, when the target write page number Pt at the elapsed time Tp is "4", the written page number Pw, i.e., "3", is less than "4" by "1". Here, as shown in part (b) of FIG. 9, the time monitoring device 546 causes one page of pattern data Dp (dummy data) to be written into a region in which no data are written, of the physical block by the read-write controller 541. Specifically, the write-destination block controller 545 designates a physical page having page ID of 4 in the physical block and causes the read-write controller 541 to write the pattern data Dp. As a result, the written page number Pw of the physical block becomes "4".

The pattern data Dp are data to which no LBA (logical address) is associated in the address translation table 44. That is, the data storage device 1 writes the pattern data Dp as data to which no logical address is associated.

The block processor 54 controls the read-write controller 541 such that the written regions of the physical block of the NAND memory 60 increase in accordance with the elapsed time Tp from the erasing time Te by repeating the process in FIG. 8. As a result, when no write data are written into the physical block in accordance with write commands, the block processor 54 causes the pattern data Dp to be written into the physical pages having page ID of 0 to 15 to cause all pages of the physical block to be the written pages, as shown in part (c) of FIG. 9.

In the data storage device 1 according to the first embodiment, dummy data are written in pages (unwritten pages) of a physical block, in which no data have been written in accordance with an elapsed time Tp. As a result, no erasure process would be carried out on the unwritten pages, which may cause an error on the pages. In other words, the data storage device 1 according to the first embodiment writes dummy data into a physical block from the erasing time Te of the physical block until the next erasure process is performed on the physical block, to continuously decrease the unwritten region and suppress error from occurring on the unwritten region when an erasure process is eventually performed thereon.

Moreover, the data storage device 1 according to the first embodiment may prevent a situation in which no data are written into pages of a physical block over a long time after data have been erased therefrom to prevent shortening of a data retention period of the physical block. Moreover, the data storage device 1 according to the first embodiment may suppress an occurrence of excessive erasure due to an erasure process being carried out on unwritten physical pages and suppress a write error due to the excessive erasure.

Moreover, the data storage device 1 according to the first embodiment may write dummy data by the NAND controller 50 independently of a write request from an external device such as a host H, etc. As a result, the data storage device 1 is capable of reducing the unwritten pages on its own determination.

Below, other examples of a write process in which data are written into a physical block in accordance with an elapsed time Tp by the data storage device 1 are described. For the same process as the flow of the write process shown in FIG. 8, the same step numbers are used, and repeated description of the process is omitted.

Figure 10:
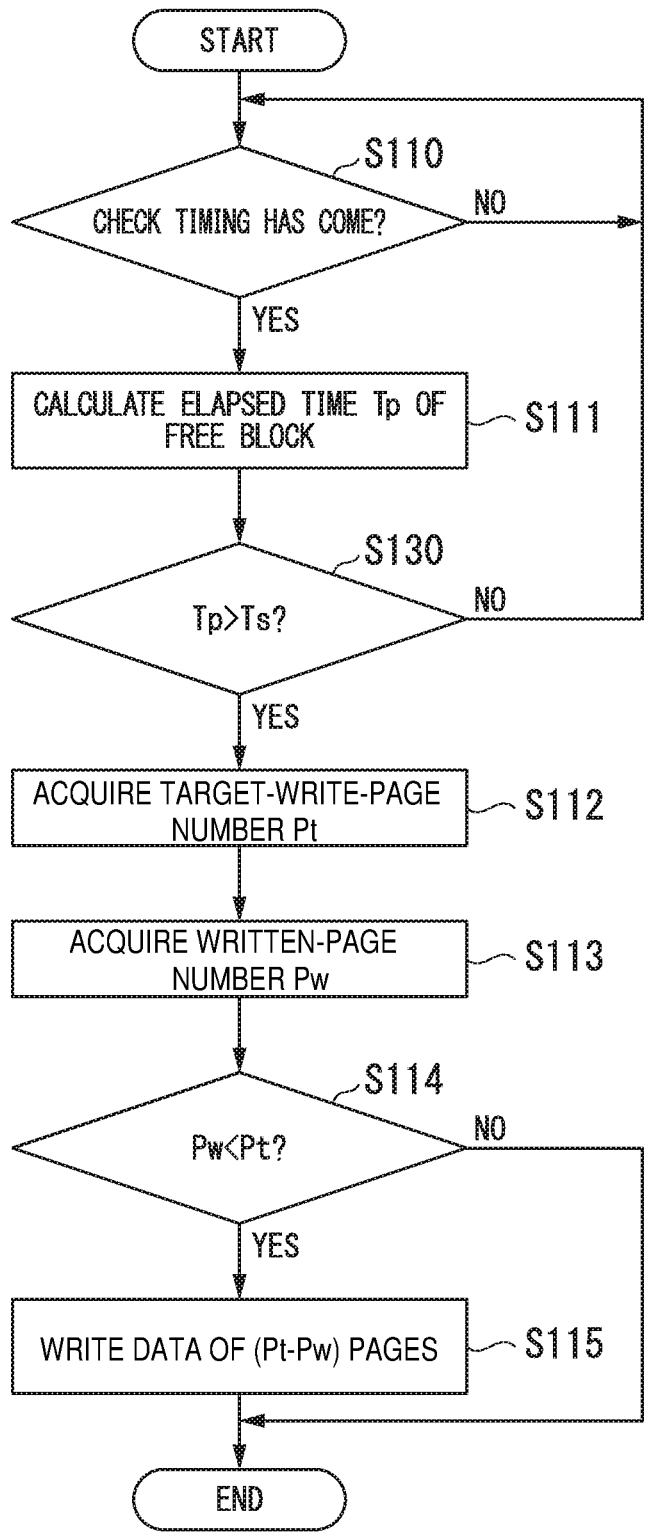
FIG. 10 is a flowchart illustrating a first variation of a writing process carried out by the NAND controller according to the first embodiment.

FIG. 10 is a flowchart illustrating a flow of a first variation of the write process carried out by the NAND controller 50 according to the first embodiment. In the first variation of the write process, following S111, it is determined whether or not the calculated elapsed time Tp exceeds a write start time Ts (S130). The process proceeds to S112 if the elapsed time Tp exceeds the write start time Ts (Yes in step S130), and returns to S110 if the elapsed time Tp does not exceed the write start time Ts (No in step S130). The data storage device 1 which performs such a write process may perform a process of S112 only if the elapsed time Tp exceeds the write start time Ts. As a result, processing frequency of the write process can be reduced.

Figure 11:
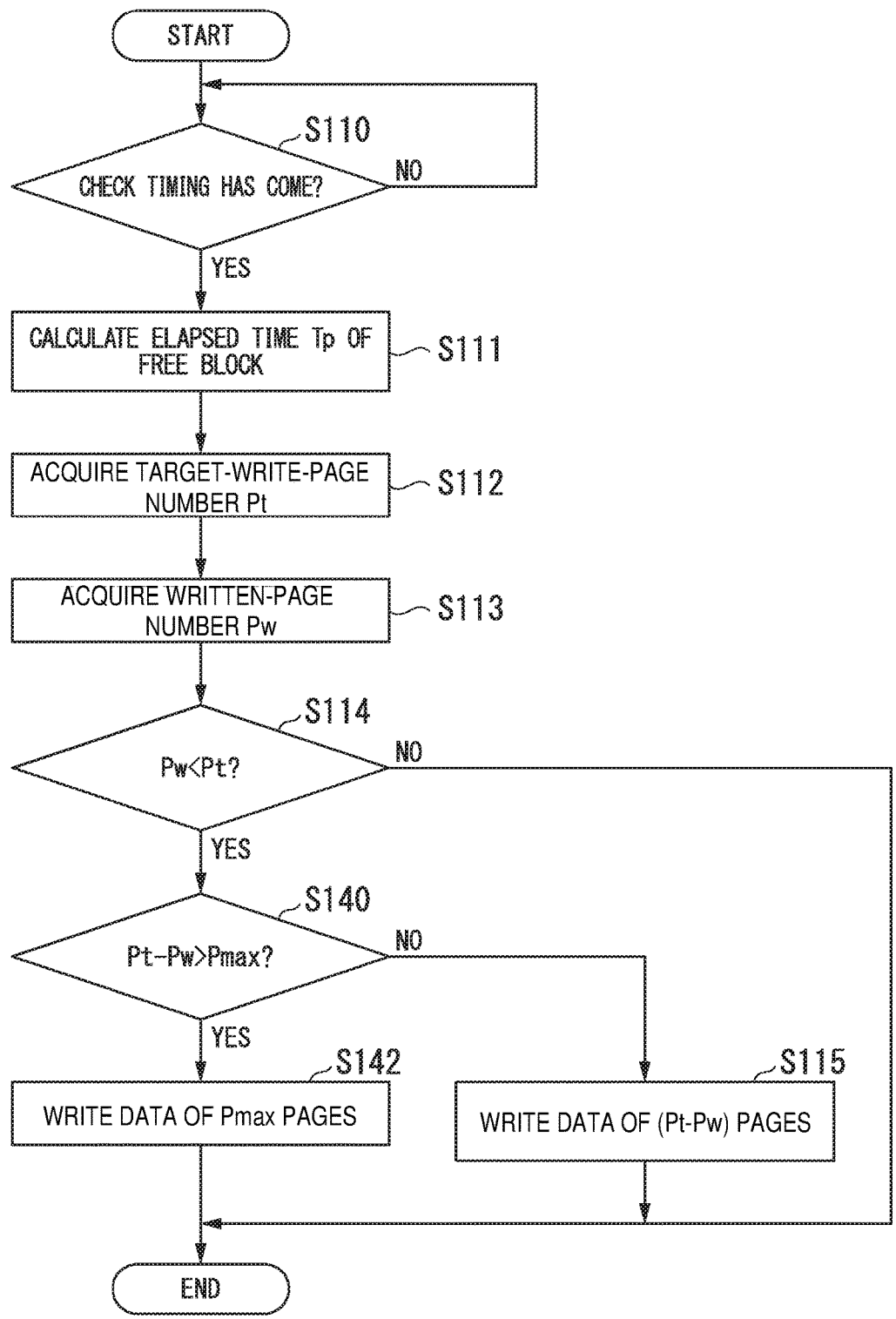
FIG. 11 is a flowchart illustrating a second variation of the writing process carried out by the NAND controller according to the first embodiment.

FIG. 11 is a flowchart illustrating a flow of a second variation of the write process carried out by the NAND controller 50 according to the first embodiment. In the second variation of the write process, the block processor 54 sets an upper limit on the number of pages into which the write process is performed at one time. The block processor 54 sets the maximum write page number Pmax, which is the upper limit on the number of pages into which the write process is performed at one time. The maximum write page number Pmax is set to a number that may not cause a process delay in the other process such as a read, etc., by carrying out the write process on the physical block. In other words, the maximum write page number Pmax is set considering a balance between reduction of the unwritten pages at the upper-limit time Tth and suppression of the process delay on the other process.

In the write process shown in FIG. 11, when the written page number Pw exceeds the target write page number Pt (Yes in step S114), the time monitoring device 546 determines whether or not the number of pages (Pt-Pw) in which data should be written exceeds the maximum—written page number Pmax (S140). When it is determined that the number of pages (Pt-Pw) exceeds the maximum write page number Pmax (Yes in step S140), the time monitoring device 546 causes the read-write controller 541 to write data of the maximum page number Pmax (S142), and the write process ends.

When it is determined that the number of pages (Pt-Pw) does not exceed the maximum write page number Pmax (No in step S140), the time monitoring device 546 controls the write-destination block controller 545 and the read-write controller 541 such that data of the number of pages (Pt-Pw) are written (S115).

The data storage device 1 which performs such a write process may set an upper limit to the number of pages of data to be written during a single write process and suppress the process delay on the other processes.

The write process described with reference to FIG. 11 may be combined with the write process described with reference to FIG. 10. In this case, the block processor 54 performs a process of S130 shown in FIG. 10 following S111 of FIG. 11 and proceeds to S112 when the elapsed time Tp reaches the write start time Ts.

Figure 12:
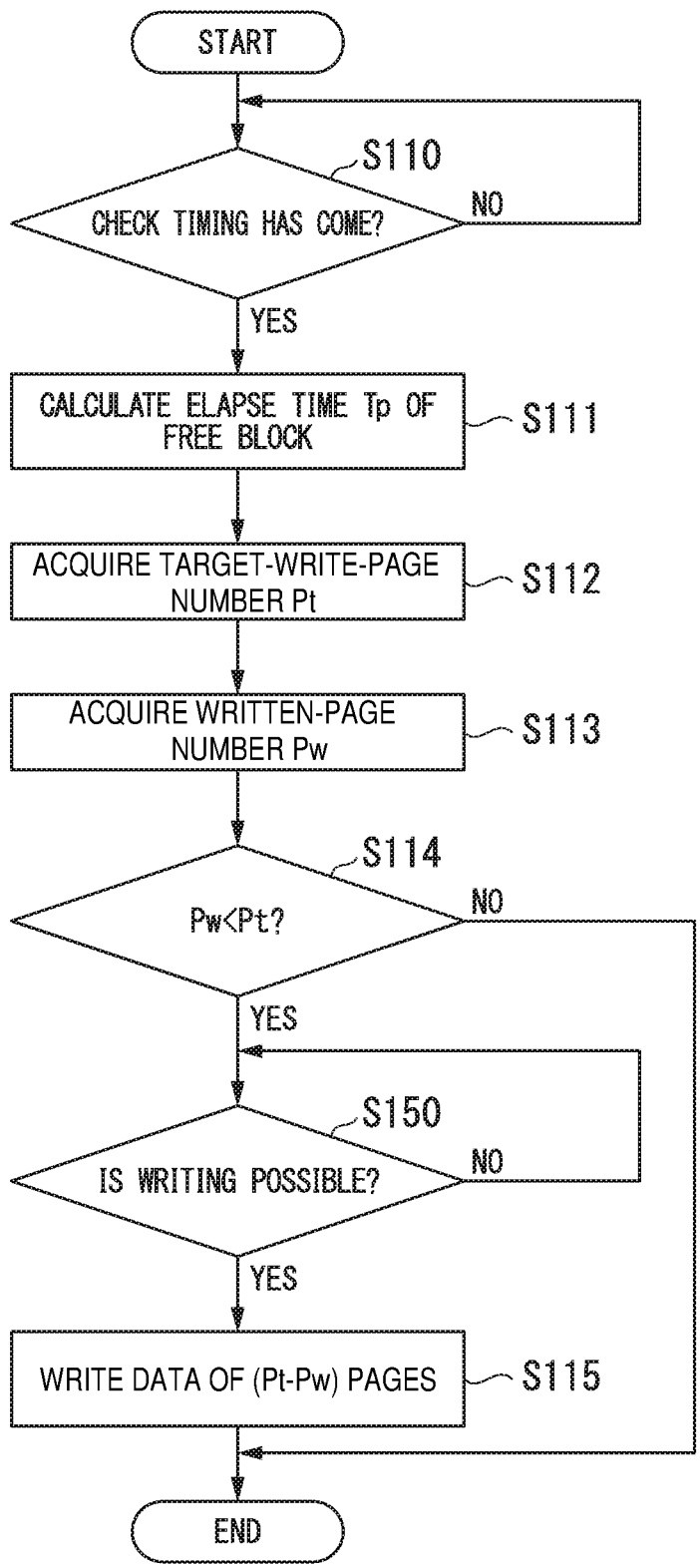
FIG. 12 is a flowchart illustrating a third variation of the writing process carried out by the NAND controller according to the first embodiment.

FIG. 12 is a flowchart illustrating a flow of a third variation of the write process carried out by the NAND controller 50 according to the first embodiment. This write process includes a step of determining whether or not a data writing is possible if it is determined to write data into a physical block (S150). In this step, based on processing state of a process other than the write process, the block processor 54 determines whether or not the data writing is possible. The process other than the write process is, for example, a read process carried out by the read-write controller 541. For example, the block processor 54 determines whether or not the process other than the write process is executed, and, if the process is executed, determines that the data write is not possible, for example.

The block processor 54 waits for the data writing if it is determined that the data writing is not possible (No in step S150). When the data writing is possible (Yes in step S150), the block processor 54 controls the read-write controller 541 such that data are written into the physical block (S115).

The data storage device 1 according to such a variation may carry out the write process into unwritten pages of a physical block to suppress the process delay on the other processes.

The write process described with reference to FIG. 12 may be combined with the write process described with reference to FIG. 10 or 11. For example, in the process in FIG. 12, the block processor 54 may perform S130 following S111 and proceed to S112 if the elapsed time Tp reaches the write start time Ts. Moreover, in the process in FIG. 12, the block processor 54 may perform S140 following S114 and determine whether to write data of the maximum write page number Pmax.

Specifically, the block processor 54 determines that the data is written into pages corresponding to subtraction of the written page number Pw from the target write page number Pt if the number of pages (Pt-Pw) does not exceed the maximum write page number Pmax. Then, the block processor 54 determines whether the data writing is possible based on processing states of the process other than the data writing (S150) and writes the data corresponding to pages (Pt-Pw or data corresponding to the maximum write page number Pmax based on the determination result.

Second Embodiment

Below, a data storage device and a memory controller according to the second embodiment are described. In the description below, elements of the data storage device 1 same as those in the first embodiment are described with the same numerals. The data storage device 1 according to the second embodiment differs from the one according to the first embodiment in that the former one writes valid data or system data into a free block instead of the pattern data. Below, the difference will be mainly described.

Figure 13:
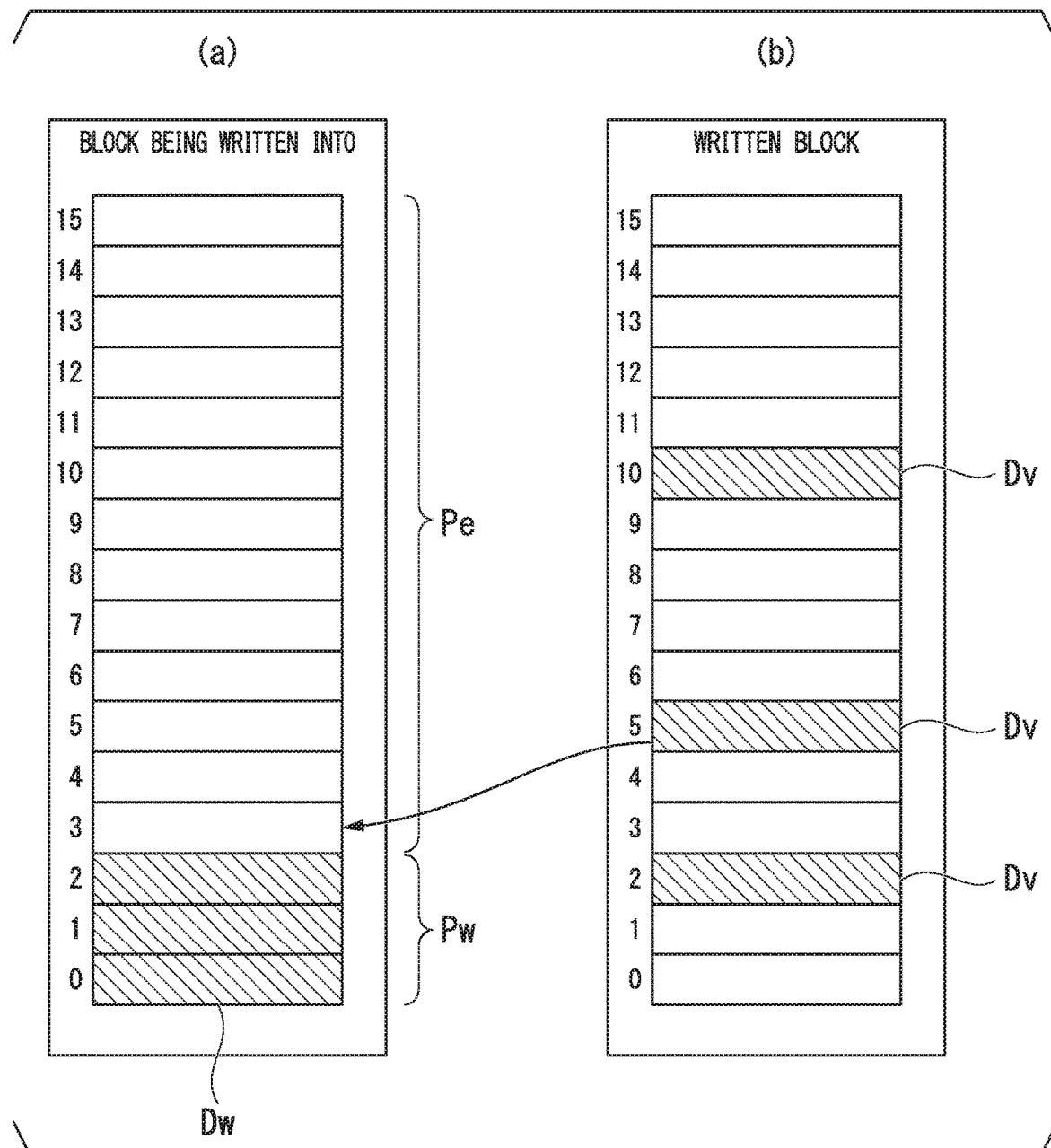
FIG. 13 illustrates an example of a manner in which data are written into a physical block according to a second embodiment.

FIG. 13 illustrates one example of how data are written into a physical block according to the second embodiment. The data storage device 1 according to the second embodiment reads valid data Dv, which have been written into another physical block of the NAND memory 60 and writes the read data into a physical page of a target physical block. The valid data Dv are write data which were write-requested by a write command transmitted from the host H, and are user data that have been already written into the NAND memory 60 by the read-write controller 541. The state of the physical block such as part (b) of FIG. 13 may occur when a page write is performed without going through the process of writing data in accordance with the elapsed time Tp, for example. The data storage device 1 may write valid data Dv read during the garbage collection into the target physical block shown in part (a) of FIG. 13.

The data storage device 1 may write, as well as user data, system data into the target physical block. The system data are data generated by the data storage device 1 among all data stored in the NAND memory 60. The system data include, for example, the address translation table 44 and the block management table 46 stored in the memory 40, for example. Some information of the address translation table 44 or the block management table 46 may be loaded to the memory 40 from the NAND memory 60 when the data storage device 1 processes data stored in the NAND memory 60.

Figure 14:
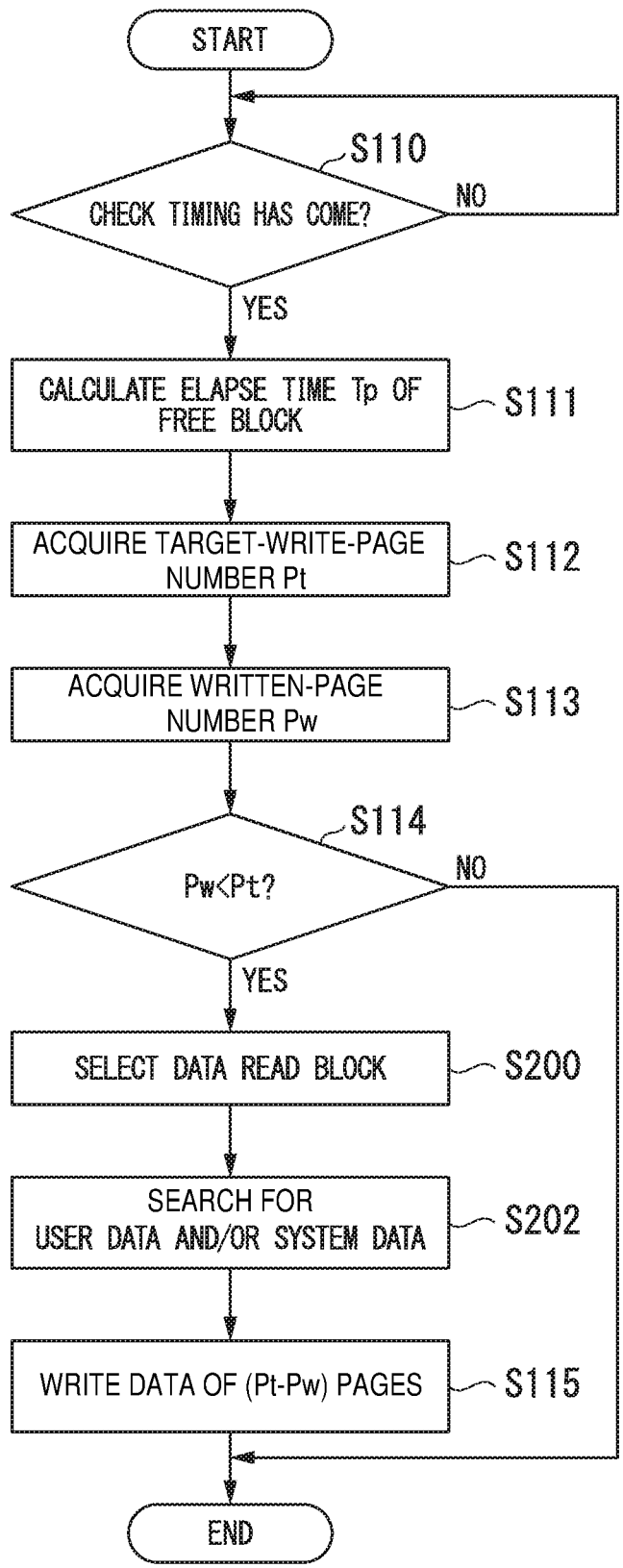
FIG. 14 is a flowchart illustrating a process of writing data carried out by the NAND controller according to the second embodiment.

FIG. 14 is a flowchart illustrating a flow of a process of writing data carried out by the NAND controller according to the second embodiment. When it is determined that the written page number Pw is less than the target write page number Pt (Yes in step S114), the block processor 54 selects a physical block in which data to be written into the target physical block are stored (S200). The block processor 54, for example, selects as the physical block, a source physical block in the garbage collection. The block processor 54 may write data read from the source physical block during the garbage collection into the target block of the write process. The block processor 54 may select a physical block targeted for refresh and write data read during the refresh into the target physical block of the write process.

The block processor 54 searches for user data and/or system data written in the selected physical block (S202). The block processor 54 controls the read-write controller 541 to read data corresponding to the number of pages to be written into the target physical block of the write process from all data written in the selected physical block. Next, the read-write controller 541 writes the read user data or system data, into a physical page having page ID that is specified by the write-destination block controller 545 (S115). The block processer 54 may search, not only one of, but both of user data and system data and cause the read-write controller 541 to write both the user data and the system data into the target physical block.

In the second embodiment, the block processor 54 may not be able to find user data in S202, for example, when the data storage device 1 has not been operated for a long time and little user data are stored in the NAND memory 60. In such a case, the block processor 54 may cause the read-write controller 541 to execute a process of writing pattern data Dp into the target physical block, instead of user data.

Moreover, in the second embodiment, any of processes described with reference to FIG. 10, 11, or 12 according to the first embodiment may be combined with the process described with reference to FIG. 14. For example, in the process described with reference to FIG. 14, a step of determining whether or not the elapsed time Tp exceeds the write start time Ts (S130 in FIG. 10) may be carried out prior to S112. Moreover, in the process described with reference to FIG. 14, the number of pages to be written into the target physical block at one data writing may be restricted based on the maximum write page number Pmax, and the step of determining whether or not data can be written may be carried out based on the processing state of other processes.

According to the second embodiment, user data or system data are written into the unwritten pages of the physical block in place of the dummy data. As a result, no erasure process would be carried out on the unwritten pages, which may cause an error on the pages. Moreover, according to the second embodiment, since user data or system data, instead of pattern data Dp, are written into the unwritten pages, a process of writing the user data or system data into a physical block other than the target physical block may not be necessary.

According to at least one embodiment described above, a controller operates to write data into unwritten pages of a physical block of a non-volatile memory from which data have been erased, in accordance with an elapsed time from the time at which data were erased. As a result, no erasure process would be carried out on unwritten pages.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device, comprising:
a non-volatile semiconductor memory including a plurality of first areas, each corresponding to an erasing unit, each of the first areas including a plurality of second areas, each corresponding to a writing unit;
an interface circuitry configured to receive an instruction from a host device; and
a controller circuitry configured to perform processing on the non-volatile semiconductor memory in response to the instruction from the host device received by the interface circuitry and to perform processing on the non-volatile semiconductor memory independently of the instruction from the host device received by the interface circuitry, the controller circuitry being configured to:
erase data stored in a first area of the non-volatile semiconductor memory,
track amount of time elapsed since the erasing of data from the first area,
write first data into one or more unwritten second areas of the first area before the tracked amount of time reaches a particular time period, and
write second data into one or more unwritten second areas of the first area after the tracked amount of time reaches the particular time period, wherein
each of the writing of the first data and the writing of the second data is carried out independently of the instruction from the host device received through the interface circuitry.

2. The memory device according to claim 1, wherein the controller circuitry is further configured to control the writing of the first data into the one or more unwritten second areas before the tracked amount of time reaches the particular time period such that an amount of written second areas in the first area reaches a certain value, the certain value being associated with the tracked amount of time.

3. The memory device according to claim 1, wherein at least one of the first data and the second data includes data to which no logical address is mapped.

4. The memory device according to claim 1, wherein at least one of the first data and the second data includes predetermined pattern data.

5. The memory device according to claim 1, wherein at least one of the first data and the second data includes third data, the third data being data that have been written into another first area of the non-volatile semiconductor memory.

6. The memory device according to claim 5, wherein the third data include valid data that have been written into the another first area in accordance with an instruction to write data from the host device.

7. The memory device according to claim 5, wherein the third data include system data that have been written into the another first area.

8. The memory device according to claim 5, wherein the controller circuitry is further configured to erase data stored in the another first area after the writing of the third data.

9. The memory device according to claim 1, wherein when an instruction to write data is received from the host device after the first data have been written, the controller circuitry is further configured to control to write the data associated with the instruction into one or more unwritten second areas of the first area.

10. The memory device according to claim 1, wherein the controller circuitry is further configured to write data requested by the instruction from the host device into one or more unwritten second areas of the first area prior to the writing of the first data and the writing of the second data.

11. The memory device according to claim 10, wherein a size of a first area is equal to the sum of a first size of the one or more unwritten second areas where the first data are written, a second size of the one or more unwritten second areas where the second data are written, and a third size of the one or more unwritten second areas where the data requested by the instruction are written.

12. A memory device, comprising:
a non-volatile semiconductor memory including a plurality of first areas, each corresponding to a unit of an erasing process, each of the first areas including a plurality of second areas, each corresponding to a unit of a writing process;
an interface circuitry configured to receive an instruction from a host device; and
a controller circuitry configured to perform processing on the non-volatile semiconductor memory in response to the instruction from the host device and further configured to perform processing on the non-volatile semiconductor memory independently of the instruction from the host device, the controller circuitry being configured to:
erase data stored in a first area of the non-volatile semiconductor memory,
track amount of time elapsed since the erasing of data from the first area, and
write data into one or more unwritten second areas of the first area such that an amount of written second areas in the first area reaches a certain value, the certain value being associated with the tracked amount of time, the data to be written into the one or more unwritten second areas having been previously stored in the non-volatile semiconductor memory and not accompanying the instruction from the host device received by the interface circuitry.

13. The memory device according to claim 12, wherein the data being written into the one or more unwritten second areas include data to which no logical address is mapped.

14. The memory device according to claim 12, wherein the data being written into the one or more unwritten second areas include predetermined pattern data.

15. The memory device according to claim 12, wherein the data being written into the one or more unwritten second areas include data that have been written into another first area of the non-volatile semiconductor memory.

16. The memory device according to claim 12, wherein when an instruction to write data is received from the host device after the data have been written into the one or more unwritten second areas in the first area, the controller circuitry is further configured to control to write the data associated with the instruction into one or more unwritten second areas of the first area.

17. The memory device according to claim 12, wherein the controller circuitry is further configured to write data requested by the instruction from the host device into one or more unwritten second areas of the first area prior to the writing of the data not accompanying the instruction from the host device.

18. The memory device according to claim 17, wherein a size of the first area is equal to the sum of a size of the one or more unwritten second areas where the data not accompanying the instruction from the host device is written and a size of the one or more unwritten second areas where the data requested by the instruction is written.

19. A memory device, comprising:
a non-volatile semiconductor memory including a first area of a first size; and
a controller circuitry configured to:
write first data to a first portion of the first area, the first data including data requested by a host to be written, and
in response to a condition being satisfied, write second data into a second portion of the first area, the second portion being different than the first portion, wherein
the second data includes system data not requested to be written by the host,
the first area is equal in size to the sum of the size of the first portion and the size of the second portion, and
the condition is satisfied independently of an instruction from the host.

20. The memory device according to claim 19, wherein the second data further includes data to which no logical address is mapped.

21. The memory device according to claim 19, wherein the second data further includes third data written into a second area of the non-volatile semiconductor memory, the second area being different than the first area.

22. The memory device according to claim 21, wherein the third data includes valid data written into the second area in accordance with an instruction from the host.

23. The memory device according to 21, wherein the controller circuitry is further configured to erase data stored in the second area after the writing of the third data to the first area.

24. The memory device according to claim 19, wherein the condition includes the elapsing of time since an accessing of the first area being a certain time period or longer.

* * * * *